Figure 1:
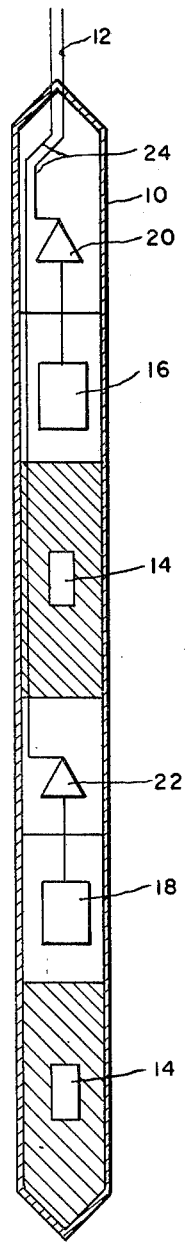

Feb. 11, 1964 G. SWIFT 3,121,164
GEOPHYSICAL PROSPECTING METHOD BY MEANS OF NUCLEAR RADIATION
Filed Oct. 27, 1958 5 Sheets-Sheet 1

INVENTOR.
GILBERT SWIFT
BY
Robert K. Schumacher
ATTORNEY

INVENTOR.
GILBERT SWIFT
BY
*Robert K. Schumacher*
ATTORNEY (PART 1)

(PART 2)

INVENTOR.
GILBERT SWIFT
BY
ATTORNEY

United States Patent Office 3,121,164
Patented Feb. 11, 1964

3,121,164
GEOPHYSICAL PROSPECTING METHOD BY
MEANS OF NUCLEAR RADIATION
Gilbert Swift, Tulsa, Okla., assignor to Well Surveys, Inc.,
a corporation of Delaware
Filed Oct. 27, 1958, Ser. No. 769,873
5 Claims. (Cl. 250—83.3)

This invention relates to the art of geophysical prospecting for valuable subsurface mineral deposits. More particularly, the invention is concerned with prospecting for oil by methods commonly referred to as radioactivity well logging. This invention provides improved methods of well logging as well as new and novel apparatus for carrying the disclosed methods and other methods into effect. By reason of this invention, zones containing salt water may now be identified and differentiated from zones containing fresh water or oil, or from zones otherwise lacking in salt content, whereby the presence or absence of oil is more certainly established.

The art of radioactivity well logging is known to include several methods, each clearly distinguishable from the other in approach, and providing usable information unique with the respective processes. Two of such methods are significant in carrying the present invention into effect. One of these methods involves the preparation of what is known as a neutron-neutron log and, the other, the preparation of what is known as a neutron-gamma ray log. These two methods of logging fall generally under the heading of neutron well logging. In making the neutron-neutron log, a detector is employed in the bore hole instrument which, predominantly, is responsive to slow neutrons, while in making the neutron-gamma ray log the detector is responsive predominantly to gamma radiation. Both of these methods, however, may employ the same, or at least a very similar, neutron source; for example, the well-known radium-beryllium source suitably shielded is applicable to both methods.

Because of the similarity of the curves provided by the neutron-gamma ray log and the neutron-neutron log, it is not customary to go to the expense of preparing both logs in undertaking the study within a particular well. Now, however, in view of discoveries made pursuant to the present invention, in surveying a particular well, preparation of both a neutron-gamma ray curve and a neutron-neutron curve is contemplated, both being carried out according to the teachings of the present invention.

General methods for preparing neutron logs are now so well known to the art that it is certainly not necessary and perhaps not desirable to describe them and their associated apparatus in minute detail. Briefly, however, it may be said that these methods comprise the movement of a suitably housed source of neutrons and a radiation responsive generator of electrical impulses (i.e., a detector) continuously from one extreme of a bore hole to the other, in the course of which the underground strata surrounding the bore hole are bombarded with neutrons; radiations which are returned to the area of the bore hole are detected by the radiation responsive generator of impulses and such impulses are amplified and sent to the surface to be received by well-known instrumentation from which the log is recorded by the recording mechanism. Ordinarily, the logging operation is performed with the neutron source being located at a fixed distance from the detector, and the source and detector are raised together, usually starting from the bottom of the well. In present practice, the spacing between the source and the detector may or may not be the same when a neutron sensitive detector is employed as when a gamma ray sensitive detector is used. The logs which are thus obtained are dependent upon the amount of radiation registered by the detectors and are in correlation with a measurement of depth of the assembly in the well.

In general, as indicated above, the logs that are obtained with either type of detector are extremely similar and until the present invention, no particular significance has been placed upon any differences which occasionally may have been observed under the relatively rare circumstances when both types of detectors have been employed to log the same well. Now, according to this invention, it has been discovered that, notwithstanding the fact that differences between the two logs appear to be very minor and have been regarded as insignificant, the fact is that they are, in certain instances, very meaningful; and by careful analysis of two such logs, that is, one prepared by the neutron-neutron method and another by the neutron-gamma ray method, and especially by applying means or methods for enhancing points of divergence and rendering them more apparent and intelligible, extremely valuable information concerning the nature of the subsurface strata may be obtained which, by other known means, has not been possible heretofore.

One such point of divergence which is observed, in accordance with and of especial interest in connection with this invention, is that which the logs reflect immediately upon or just after passing from a salt water bearing stratum into a less salty liquid-bearing stratum. This example of such divergence will hereinafter be employed as illustrative of the general principles and general methods and apparatus employed in describing the invention.

One of the characteristics of a neutron log is that the identification of liquid-bearing strata is afforded. However, little indication is provided as to the nature of the liquid, i.e., whether it is oil or water. Therefore the art is continuously in search of some ancillary analytical method by which the exact nature of the liquid may be ascertained with certainty.

It has been discovered that under certain conditions of neutron logging, the amount of radiation registered by a slow neutron detector will diminish as the source and detector pass from a fresh water bearing formation to an otherwise similar but salt water bearing formation while, a detector which is primarily designed for faster neutron detection or for gamma ray detection will register less decrease in radiation or even a slight increase in radiation. This same phenomenon is observed where the liquid containing formation includes oil instead of fresh water, i.e., an oil layer and a salt water layer. Therefore, where this deviation of the two curves occurs in a liquid-bearing stratum, one is certain that two different liquids are adjacent. By being able to identify from the curves the salt-containing water as such, it follows directly that other adjacent liquid-bearing zones must contain either oil or fresh water. If the liquid-bearing zones are below the level for the occurrence of fresh water one is led immediately to conclude that the other liquid is oil. The same phenomena are observed when the liquid bearing strata are not adjacent but are separated by other formations.

It will be appreciated by those skilled in the art that the present discovery and invention opens up a considerable opportunity for more complete analysis of the nature of underground strata and that various applications of the teachings of this invention with respect to the comparison of the two logs in question quite readily will suggest themselves. Thus, as broadly stated, this invention contemplates as an object the preparation of at least two logs within a single well bore which logs in the main reflect no substantial differences other than as occasioned by particular material; an examination of such logs whereby to determine deviations or differences in the nature of the curves recorded, and establishing the nature of the formations productive of such differences as between the two logs, whereupon an intelligent decision can be reached as to the probability of the existence of valuable mineral deposits.

A more particular object of this invention, in accordance with the specific illustration of the invention contained herein, is that of logging a well to provide a neutron-neutron curve and a neutron-gamma ray curve, comparing the two logs so as to obtain an indication of the presence and position of formations in which the response of the neutron sensitive detector is at variance with the response of that of the gamma ray sensitive detector, more particularly, two such logs in which the response of the neutron sensitive detector is diminished relative to the response of the gamma ray sensitive detector, thereby enabling the presence and location of salt water bearing formations to be determined by inspection whereby to obtain valuable information concerning the nature of the underground strata being logged.

Another object of this invention is to provide method and apparatus for enlarging or enhancing the relative difference between the responses of the two detecting instruments while preserving their similarity of response in zones which are lacking in matter which is productive of such log differences.

A further object is that of providing apparatus which is especially adapted to a rapid and convenient registration of the radiations involved.

The invention herein described may be practiced by using various forms of well logging equipment, all of which is generally well known to those skilled in the art. In its most elementary form, the invention may be practiced by providing a single neutron source of the type commonly used in neutron well logging, such as, for example, a capsule containing a mixture of radium salts and powdered beryllium, housed in a shield of lead or other dense material. By means of screw threads on the upper end of this source and shield assembly, it may be removably attached to either of two detector-amplifier assemblies of familiar construction. The response of these detector-amplifiers must be different with respect to different radiations. The various materials in and about the formations differently affect the radiations returning to the subsurface instrument as a result of the neutron bombardment. In accordance with this invention the response of the detectors to particular radiations is such that they respond in similar fashion to the effect of at least one particular material and in different fashion to the effect of at least one other particular material. More particularly the detectors may respond similarly to the relative presence of hydrogen and differently to the relative presence of chlorine. Still more particularly and as indicated above, one of these detector-amplifier assemblies may contain a detector which is predominately sensitive to slow neutrons such as an ionization chamber or a counter tube containing boron trifluoride gas, and the other may contain a detector predominately sensitive to gamma radiation such as an ionization chamber containing argon gas or a Geiger tube containing argon together with a suitable quenching gas. In this specific case the detectors are similarly responsive to the relative presence of hydrogen and oppositely responsive to the relative presence of chlorine. A preferable, though not necessary arrangement of the apparatus results in normalized curves. That is, the apparatus may be arranged so that when the logging instrument traverses the well, two curves are made which deflect equally except in the presence of particular material, most particularly chlorine. This may be accomplished, for example, by adjustment of the spacing of the detectors to the source and by selecting the detector material such that, in the presence of any fixed amount of at least one particular material, the responses of the two detectors to variations in amount of other materials are linearly related to each other. Then, when recording the second of the two curves, its amplitude and zero position may be set so as to obtain deflections equal to those of the first curve for all formations from which the one particular material is absent, or for all formations in which the amount of the one particular material present is constant.

The final step comprises analysis of the two records thus obtained wherein the two logs are correlated or compared with each other in order to resolve the responses of the two detectors into terms of the relative presence of the one particular material and of the other material. This analysis may be accomplished in any one of several ways. One of these ways is adapted to be employed with the preferable arrangement of the apparatus described above. Since this arrangement provides two curves which are substantially matched with respect to the other materials, any departure from the matched condition represents a variation in the amount of the particular material. Accordingly, the analysis may, in these cases, be accomplished by first correlating the two curves with respect to depth, next, superimposing them such that the two curves merge into one wherever the deflections are matched, and finally observing, in those portions of the record where the curves fail to merge, the amount and direction of the separation between the two curves. Under these circumstances, the separations provide a direct measure of the relative presence of the one particular material. The deflections of the two curves may be further resolved in this way to determine the relative presence of the other material provided the characteristics of the detectors, with respect to their response to the one particular material is known. For example, the apparatus may be so constructed that the departures from equal deflection occasioned by the presence of particular material are equal and opposite. In this event the relative presence of the other material is determined by observing the mean of the deflections of the two matched curves.

Another way of analyzing the responses of the two detectors in order to resolve the question of the relative presence of the particular material and of the other material consists of plotting one of these responses as a function of the other. This may be accomplished manually, after the two logging curves have been recorded, or automatically, by means of a commercially available X—Y recorder, at the time of logging the well or later on. This way avoids the requirement for matching the deflections of the two curves and the requirement that the responses of the two detectors be linearly related to each other with respect to variation of the presence of any material. It is only necessary that the responses of the two detectors to the particular material be related to each other differently than the responses of the same detectors to the other material are related to each other.

The X—Y plot, whether performed manually or automatically, consists of a set of points disposed at various locations with respect to a pair of axes, on a plane surface. Each point represents a pair of detector responses, specifically the responses of the two detectors described above, correlated with respect to depth. If the logging apparatus is so constructed that the two responses are simultaneously registered at two different depths a delay mechanism of the type described in U.S. Patent 2,436,503 to James Y. Cleveland may be employed in one of the signal channels. By proper selection and adjustment of this device the appropriate signal may be delayed to achieve depth correlation. This may be extended to use with measurements made on separate traverses of the well, at least one of the logs being recorded on magnetic tape or some such medium for later reproduction in correlation with the other. The X—Y recorder is thus arranged to position its pen in the direction of the X axis in accordance with the response of the first detector and in the direction of the Y axis in accordance with the response of the second detector. These commercial X—Y recorders can easily be arranged to cause the pen to mark a dot each time the responses change from increasing to decreasing and vice versa, or to mark dots at predetermined intervals of time or depth. It will be apparent that in the absence of the particular material, all the dots would lie along some line representative of the relationship existing between the responses of the two detectors to the other material. This line would be straight if the responses were linearly related, or curved if the responses were related but not linearly related. Furthermore, the presence of the particular material will result in the position of the dot representing the responses thereby produced failing to lie on that line, and the presence of a larger amount of the particular material will result in the plotting of a dot still farther removed from that line. Accordingly, through the experience gained in logging a number of formations in a single well, or through greater experience accumulated from more comprehensive well and laboratory tests lines can be drawn or calibration charts prepared by means of which the position of any one of the dots in the X—Y plot may be resolved into terms of the relative presence of the particular material and the other material.

Still another way to resolve the logging signals is to use a computer into which, after properly correlating the signals with respect to depth, the signals from the two detectors are fed. The computer acts upon these two signals in predetermined manner adapted to take into account the existing relationship between the responses of the two detectors to the particular material and also taking into account the existing relationship between the responses of the same detectors to other material. As a result of its action the computer furnishes output data representative of the relative presence of the particular material and separate output data representative of the relative presence of the other material.

This final step may comprise the correlation of the two records to observe portions in which the response of one detector is dissimilar to the response of the other detector. As indicated above, the deviation in the response of the gamma-ray sensitive detector from the response of the neutron detector indicates the relative presence of chlorine.

In using herein the words "resolve" and "resolving," it will be understood that the terms are intended to cover the derivation of indications of the relative presence of materials in the formation by whatever methods that may be employed. It is obvious that the terms are not to be understood to imply only resolution by mathematical procedures. This fact will be fully appreciated upon recalling that by applying the teachings herein, one may derive the desired information by purely visual observance. Similarly, the terms are intended to embrace the methods wherein electro-mechanical equipment is employed to provide an indication of the desired intelligence. Thus the terms are employed in their broadest sense.

Similarly the term "correlate" and its derivatives do not imply merely depth correlation but, when used with the pairs of logs, include any determination of the relationship between the two, most particularly to derive the desired information.

Figure 2:
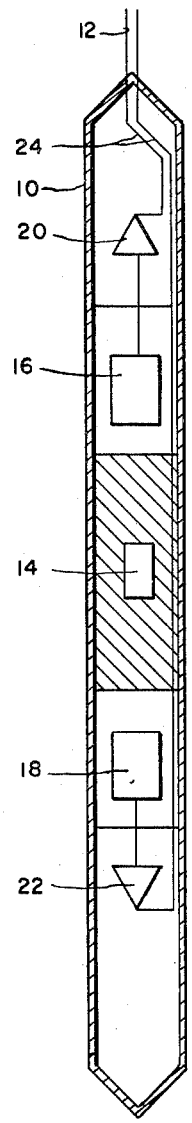
Figure 3:
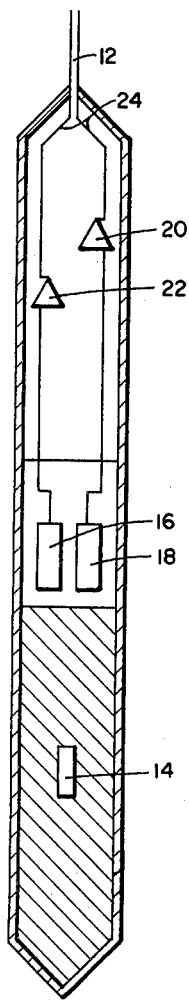
Figure 4:
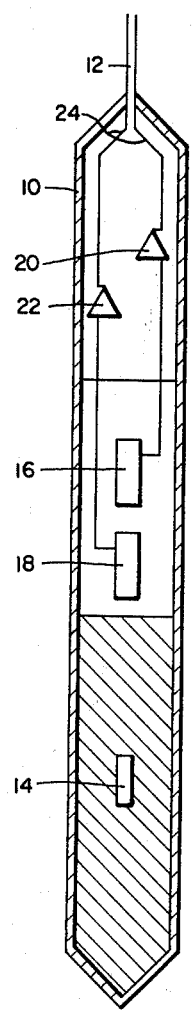
Figure 5:
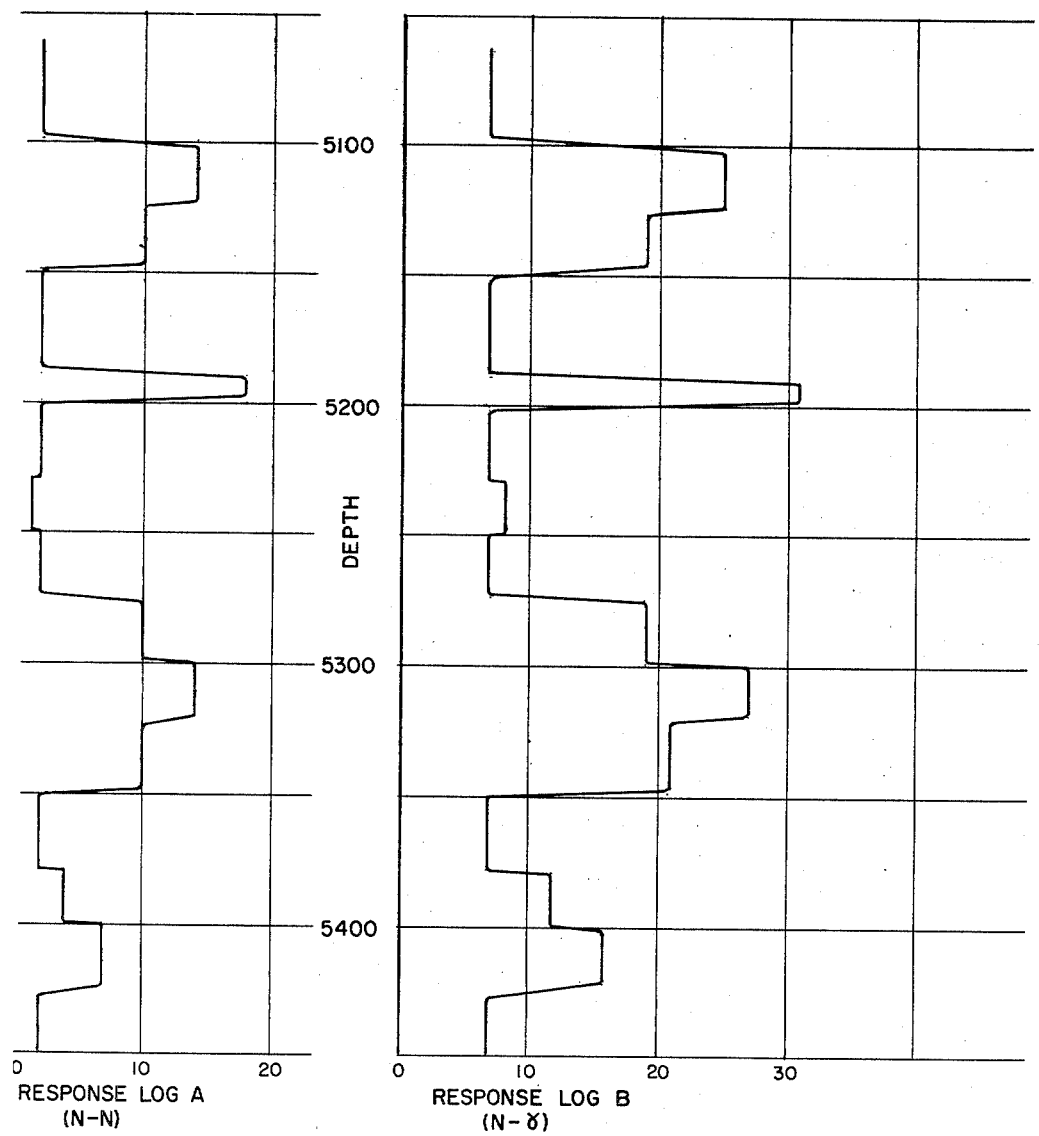
Figure 5:
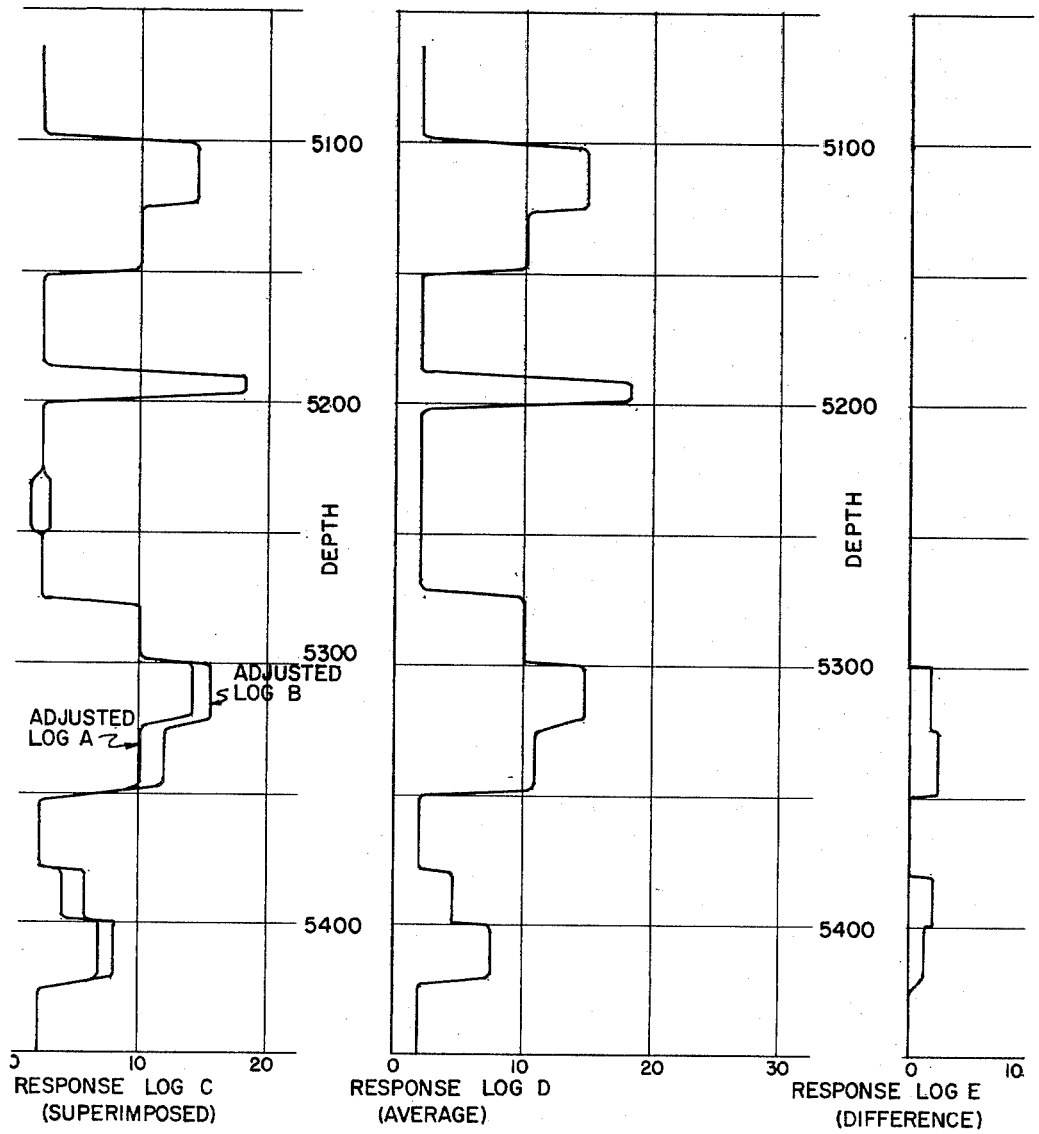
Figure 6:
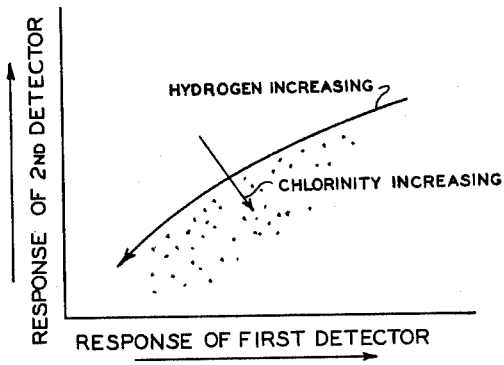
Figure 7:
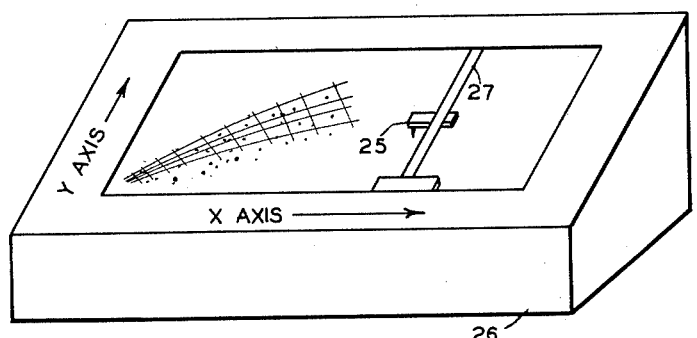
Figure 8:
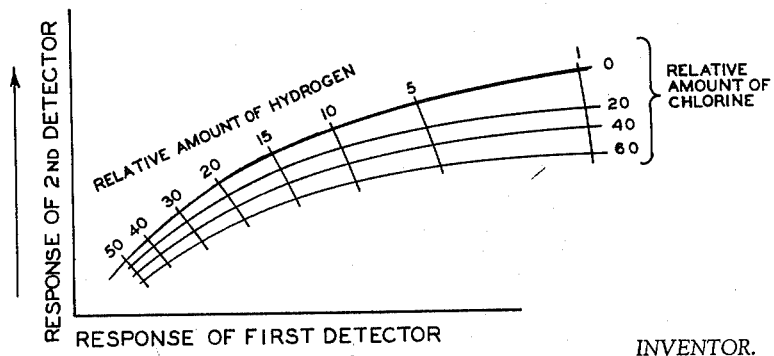

Additional forms of apparatus suitable for use in connection with the invention are illustrated in the drawings. Referring to the drawings, FIG. 1 is a schematic illustration of a subsurface prospecting instrument in which two neutron sources and two detector-amplifier assemblies are mounted in the same housing; FIG. 2 of the drawings is a similar schematic wherein only one neutron source is employed; FIG. 3 is a further schematic showing wherein only a single neutron source is employed and in which the two detectors are in side-by-side relationship; FIG. 4 is a still further schematic showing employing a single neutron source but having the two detectors offset with respect to each other so that the source to detector spacing is somewhat different. FIG. 5 illustrates logs made in accordance with the instant invention. FIG. 6 shows an X—Y record made in accordance with the instant invention. FIG. 7 shows an X—Y recorder for making the record of FIG. 6. FIG. 8 is a calibration chart upon which the record of FIG. 6 is preferably made. In the drawings, like numerals refer to like or similar parts.

Considering the drawings, which in general indicate conventional apparatus, numeral 10 therein denotes the outer casing for the well surveying equipment which is raised and lowered within the well bore by means of cable 12. As is well known, cable 12 also serves to contain the circuitry to and from above ground. Numeral 14 denotes a neutron source, or sources, which in practice are heavily shielded in a manner and for reasons well known to those skilled in the art. Numeral 16 denotes detector number 1, which may be gamma-ray sensitive, numeral 18 denotes detector number 2, which may be neutron sensitive, and numerals 20 and 22 their respective amplifiers. Numeral 24 denotes generally the circuitry by which electrical impulses are carried to the above ground instrumentation for processing and use in preparing the logs. Further reference will be made to the drawings at a later point herein.

As indicated above, it is desirable to effect as much indication of the difference in response of the two detectors as possible whereby to render the task of comparing the two curves easy to accomplish. Enhancement of such differences may be obtained by a suitable selection of the spacing of the two detectors with respect to the sources. For example, using a particular pair of detectors with a spacing of about 18 inches between the sources and the near end of either detector, it is found that the decrease in response of the neutron-sensitive detector is only 8% in passing from one layer of liquid bearing sand to a similar sand containing water of 10% salt content, while the increase in response of the gamma ray-sensitive detector is about 12%. However, at closer spacings, for example, 14 inches, the decrease for the first detector becomes 17% and the increase for the second detector becomes 13%. At still closer spacings of 12 inches the decrease is altered to 25% while the increase is altered to 10%. Of the three spacings described, the twelve inches spacing is preferable since it provides the greatest distinction between an oil and a salt water bearing sand. However, it is apparent that the greatest decrease for the first detector is obtained at 12 inch spacings while the greatest increase for the second detector is obtained at 14 inches. In spite of these facts, it may be preferred to operate both detectors at the same spacing, preferably 12 inches.

Additional enhancement of the relative difference between the response of the two detectors may be obtained by taking the necessary steps to diminish the response to slow neutrons of the apparatus containing the gamma ray sensitive detector. Even though a predominately gamma ray sensitive detector is employed for this purpose, the housing of the apparatus, which must withstand severe pressures encountered in deep wells and is therefore ordinarily made of steel, absorbs slow neutrons and thereupon emits gamma rays which register on the detector. Thus, the apparatus, as ordinarily constructed, responds both to gamma rays and slow neutrons. This tends to counteract or nullify the ability of the gamma ray sensitive detector to respond to salt bearing zones by increased registration. Enhancement of the desired effect may be obtained by placing a suitable shield around the detector portion of the apparatus, or by constructing the detector itself and the surrounding housing of suitable materials.

One such suitable shield comprises an outer layer of plastic material including boron oxide and an inner layer of lead. Suitably, these layers may be about ⅛ to ¼ inch thick in the case of the boron oxide plastic layer and from ¼ to ½ inch thick in the case of the lead layer. Such a shield absorbs slow neutrons by virtue of its boron content while the lead absorbs relatively low energy gamma rays emitted by the boron upon its capture of the neutrons. Alternate constructions will be apparent. A suitable material for the construction of the detector and housing is aluminum, which absorbs slow neutrons much less than does steel. Within the detector itself, xenon is preferable to argon for use as the gas for the same reasons. The addition of a shield as described above to the gamma ray sensitive detector in a particular instance is found to effect alteration in its response upon entering the salt water containing zone from about 13% to about 34%.

Additional speed and convenience in practicing the present invention may be realized by recording the radiations registered by both types of detectors during a single traverse of the well. This may be accomplished in any of several ways as has been indicated above in referring to the drawings. Referring to FIG. 1 of the drawings, a single logging instrument may be constructed in which two neutron sources are used, each located at a fixed, and preferably like, distance from one of the two detectors. In this illustration of the invention, the source-detector pairs are spaced at a distance of the order of 6 to 10 feet; in any case, sufficient to avoid interference due to radiations produced by one source reaching the other detector. With this instrument, the signals produced by the two detectors are separately amplified and are transmitted to the surface over mutually non-interfering transmission paths where they are recorded in appropriate correlation with the depth of the respective detectors.

Alternatively, the two detectors may be disposed above and below a single neutron source as is shown in FIG. 2, or both may be placed together as is shown in FIG. 3, although in this latter instance, each under present conditions must necessarily be smaller, and thus, less sensitive. FIG. 4 of the drawings illustrates the use of a single neutron source with the detecting instruments offset from each other somewhat. Thus, the source to detector spacings as between the two detectors is unequal and is less preferable since the disadvantage that certain zones other than salt bearing ones tend to produce differences in the relative radiation intensities registered by the two detectors is encountered.

It will be understood that all of this apparatus is used in a substantially identical fashion and as generally described above to produce the two curves which, taken together, provide a composite of information sufficient to inform one of the existence of particular material, most particularly that a liquid bearing stratum is salt-water bearing.

It is believed that those skilled in the art, with the foregoing discussion of the present invention before them, will be able to practice the invention without difficulty. Undoubtedly, various modifications of and departures from the teachings herein will occur to those skilled in the art as this invention is considered in practice. Therefore, it is desired to emphasize that the invention is not limited strictly to the embodiments discussed and illustrated herein and it is desired to point out some departures from the above teachings which, nevertheless, are within the spirit of the invention.

If desired, instead of or in addition to recording the two detector responses, a signal representative of their difference or a signal representative of the ratio between the two responses may be derived in well known manner and recorded by well known methods. Similarly, the sum of the two responses may be recorded. This is particularly advantageous when the responses are related linearly, as discussed above. In this case, by adding the appropriate constants and applying appropriate scale factors in the signal combining processes, one may obtain a first record indicative of liquid content but independent of saltiness, and a second record indicative of saltiness but independent of liquid content.

FIG. 5 illustrates one manner in which the responses of two detectors may be correlated or resolved to indicate particular material, most particularly chlorine or hydrogen. In the illustration log A represents a neutron-neutron log as recorded in the field at the well. Similarly, log B represents a neutron-gamma ray log. Although it is not obvious, the responses to hydrogen (or elements other than chlorine) of the two logs are related to each other linearly.

Log C represents log B, after it has been operated upon to normalize it with respect to log A, superimposed on log A. The operations performed on log B were to multiply its deflections by ⅔ and then to subtract 2.66 units. The same result would be obtained by first subtracting 4 units, then multiplying by ⅔. It is evident that the two logs now coincide in a number of places, but that they fail to coincide everywhere. The separation between these two curves is indicative of the amount of chlorine present. If nothing is known about the chlorine content those formations in which the curves match it can only be said that where these separations appear there is more chlorine present than in the "matched" formations. There being no "negative" or reversed separations present, it can be said that there are no formations present having less chlorine than the "matched" formations.

On the other hand, if the "matched" formations are known to be chlorine free, the magnitude of the separations may be used as a measure of the chlorine content of the "non-matching" formations.

Log D represents a "mean" log and log E a "difference" log. If it is further assumed that log A and log B are equally, but oppositely affected by chlorine then their mean is an indication of formation properties other than chlorine. This is ordinarily principally hydrogen. The difference between the pair of logs shown superimposed in log C has been plotted separately, resulting in the difference log. The size of the difference increases with increasing chlorine. It is not a necessary condition that the two logs be affected equally or oppositely by chlorine for their difference to have this property. It is only necessary that the two logs (after one has been operated upon) have like responses to material other than chlorine. Log E then is a chlorine log, and log D a hydrogen log.

FIGS. 6, 7 and 8 illustrate a particular manner in which the responses of the two detectors are correlated to resolve the question of the relative presence of particular material.

In FIG. 6 the response of one detector is plotted as a function of the other detector for particular depths in the well. This may be performed manually by reading the deflection of the two logs, such as log A and log B, and plotting one as the function of the other. Alternatively, the response of the two detectors may be applied to an X—Y recorder 26 as illustrated in FIG. 7. The response of one detector drives carriage 27 along the X-axis; whereas the response of the other detector drives pen 25 along carriage 27 in the Y-direction. The pen automatically marks at the appropriate times, making the record of FIG. 6. In the preferred form of this invention, after a number of points have been plotted, a hydrogen increasing line or minimum chlorine line is established by a line of marks defining one boundary of the cloud of marks. Deviation from this line indicates the relative presence of chlorine. The position of this line and the deviation therefrom occasioned by chlorine depends upon the particular instrumentation used. However, each apparatus may be empirically calibrated and the information plotted on calibrated charts. A particular chart is illustrated in FIG. 8. By use of such a chart, the relative amounts of chlorine and hydrogen may be read directly from the X—Y record.

From the foregoing description, those skilled in the art will appreciate that many departures may be made from the specific illustrations herein given within the spirit of the invention. Accordingly it will be understood that the invention is not limited as specifically defined herein.

I claim:

1. A method of geophysical prospecting for valuable mineral deposits within a borehole penetrating earth formations which comprises bombarding the earth formations with high-speed neutrons; detecting first radiations arising as a result of said bombardment which return to said borehole, and deriving from said detection step, in correlation with depth, first signals indicative of characteristics of the formations; detecting second radiations arising as a result of said bombardment which return to said borehole, and deriving from said second detecting step, in correlation with depth, second signals indicative of characteristics of said formations; the intensity of said first and second radiations being similarly dependent upon the relative presence of at least one material and differently dependent upon the relative presence of at least one other material; and deriving an indication of the relative presence of at least one of said materials by recording one of said signals as ordinates and the other as abscissae at successive depths in said borehole whereby the relative presence of at least one of said materials is indicated by deviation from normal.

2. A method of geophysical prospecting for valuable mineral deposits within a borehole penetrating earth formations which comprises bombarding the earth formations with high-speed neutrons; detecting first radiations arising as a result of said bombardment which return to said borehole, and deriving from said detection step, in correlation with depth, first signals indicative of characteristics of the formations; detecting second radiations arising as a result of said bombardment which return to said borehole, and deriving from said second detecting step, in correlation with depth, second signals indicative of characteristics of said formations; the intensity of said first and second radiations being similarly dependent upon the relative presence of hydrogen and differently dependent upon the relative presence of chlorine and deriving an indication of the relative presence of chlorine by recording one of said signals as ordinates and the other as abscissae at successive depths in said borehole whereby the relative presence of at least one of said materials is indicated by deviation from normal.

3. A method of geophysical prospecting for valuable mineral deposits within a borehole penetrating earth formations which comprises bombarding the earth formations with high-speed neutrons; detecting first radiations arising as a result of said bombardment which return to said borehole, and deriving from said detection step, in correlation with depth, first signals indicative of characteristics of the formations; detecting second radiations arising as a result of said bombardment which return to said borehole, and deriving from said second detecting step, in correlation with depth, second signals indicative of characteristics of said formations; the intensity of said first and second radiations being similarly dependent upon the relative presence of at least one material and oppositely dependent upon the relative presence of at least one other material; and deriving an indication of the relative presence of at least one of said materials by recording one of said signals as ordinates and the other as abscissae at successive depths in said borehole whereby the relative presence of at least one of said materials is indicated by deviation from normal.

4. A method of geophysical prospecting for valuable mineral deposits within a borehole penetrating earth formations which comprises making two measurements in said borehole as functions of depth therein similarly influenced by one variable and differently influenced by a second variable, and recording one of said measurements as ordinates and the other as abscissae at successive depths in said borehole.

5. A method of geophysical prospecting for valuable mineral deposits within a borehole penetrating earth formations which comprises independently detecting first and second radiations in said borehole as a function of depth therein by deriving respective first and second signals systematically related thereto, said first and second radiations being similarly influenced by one formation variable and differently influenced by a second formation variable, and recording one of said signals as ordinates and the other as abscissae at successive depths in said borehole.

References Cited in the file of this patent

UNITED STATES PATENTS

| | | |
|---|---|---|
| Re. 24,383 | McKay | Oct. 29, 1957 |
| 2,776,378 | Youmans | Jan. 1, 1957 |
| 2,850,642 | Seevers | Sept. 2, 1958 |
| 2,862,106 | Scherbatskoy | Nov. 25, 1958 |
| 2,903,590 | Somerville | Sept. 8, 1959 |
| 2,971,094 | Tittle | Feb. 7, 1961 |